Oct. 30, 1945.  W. P. GRUNER  2,387,899
ICE-MAKING MACHINE
Filed Aug. 30, 1943  3 Sheets-Sheet 1

INVENTOR.
WILLIAM P. GRUNER
BY
ATTORNEY

Oct. 30, 1945.  W. P. GRUNER  2,387,899
ICE-MAKING MACHINE
Filed Aug. 30, 1943   3 Sheets-Sheet 2

INVENTOR.
WILLIAM P. GRUNER
BY
ATTORNEY

Oct. 30, 1945.    W. P. GRUNER    2,387,899
ICE-MAKING MACHINE
Filed Aug. 30, 1943    3 Sheets-Sheet 3
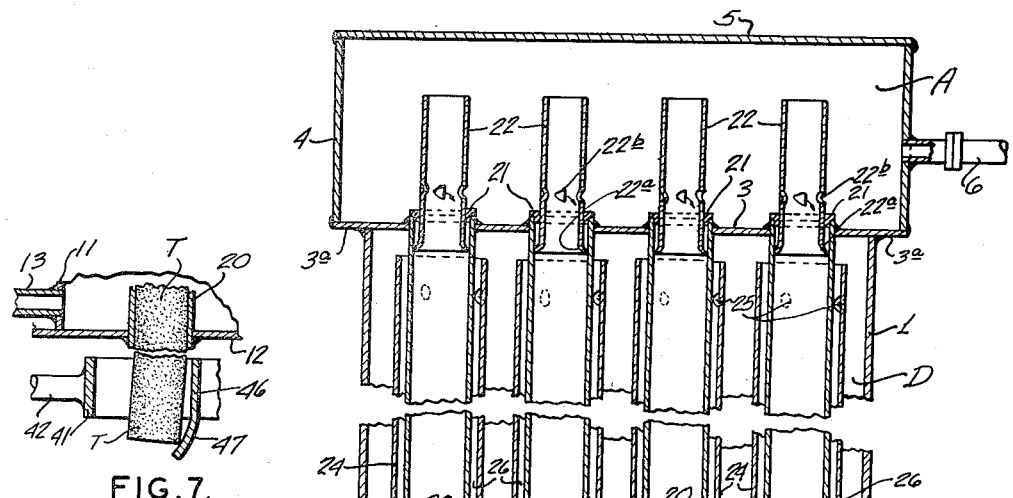
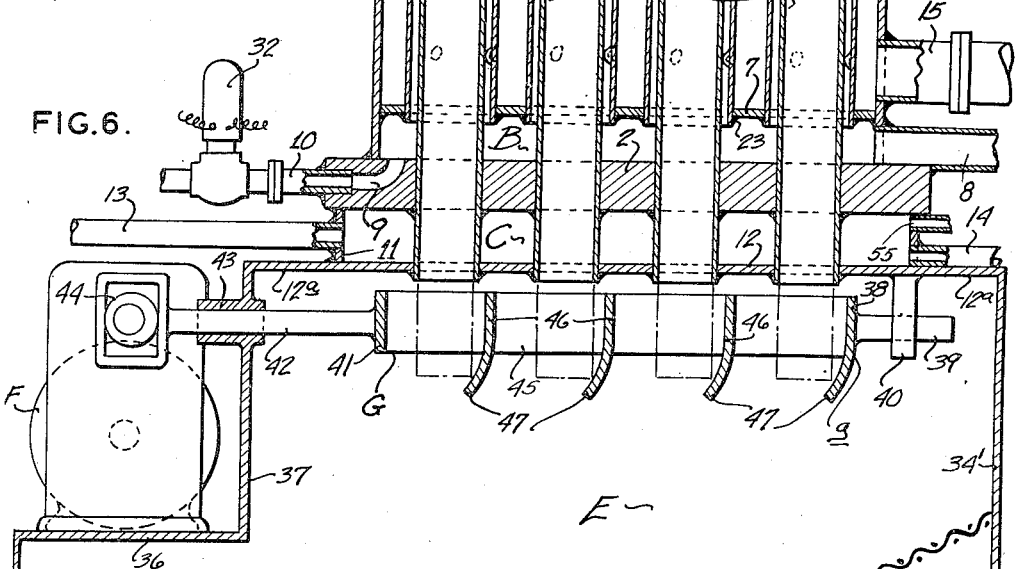
INVENTOR.
WILLIAM P. GRUNER
BY
ATTORNEY Patented Oct. 30, 1945

2,387,899

UNITED STATES PATENT OFFICE 2,387,899

ICE-MAKING MACHINE

William P. Gruner, St. Louis, Mo., assignor of one-fourth to Oliver R. Burkhart, Webster Groves, Mo., one-fourth to Walter H. Burkhart, and one-fourth to Hilbert W. Hagnauer, both of Ladue, Mo.

Application August 30, 1943, Serial No. 500,482

8 Claims. (Cl. 62—164)

This invention relates to a certain new and useful improvement in ice-making machines.

My invention has for its principal object the provision of a machine so constructed as to first freeze flowing water into ice in elongated rod or tube form, to then defrost the ice-forming tubes or chambers, so as to release the ice-tubes or rods from adherence to the ice-forming tubes and thereby permit the ice-rods or tubes to drop endwise from such ice-forming tubes or chambers, and to then break or chip the dropping ice-rods or tubes into small pieces or fragments easily removable from the machine and conveniently usable in the icing of a water cooler or other structure.

My invention has for a further object the provision of a machine of the type and for the purpose stated which is simple and durable in structure, which may be economically constructed and operated, and which is efficient in the performance of its intended functions.

And with the above and other objects in view, my invention resides in the novel features of form, construction, arrangement, and combination of parts presently described and pointed out in the claims.

In the accompanying drawings (three sheets),

Figure 6 is an enlarged vertical sectional view of the machine taken approximately on the line 6—6, Figure 2; and Figure 7 is an enlarged detail sectional view of the machine, illustrating co-operable parts as in an ice-breaking operation.

Figure 1:
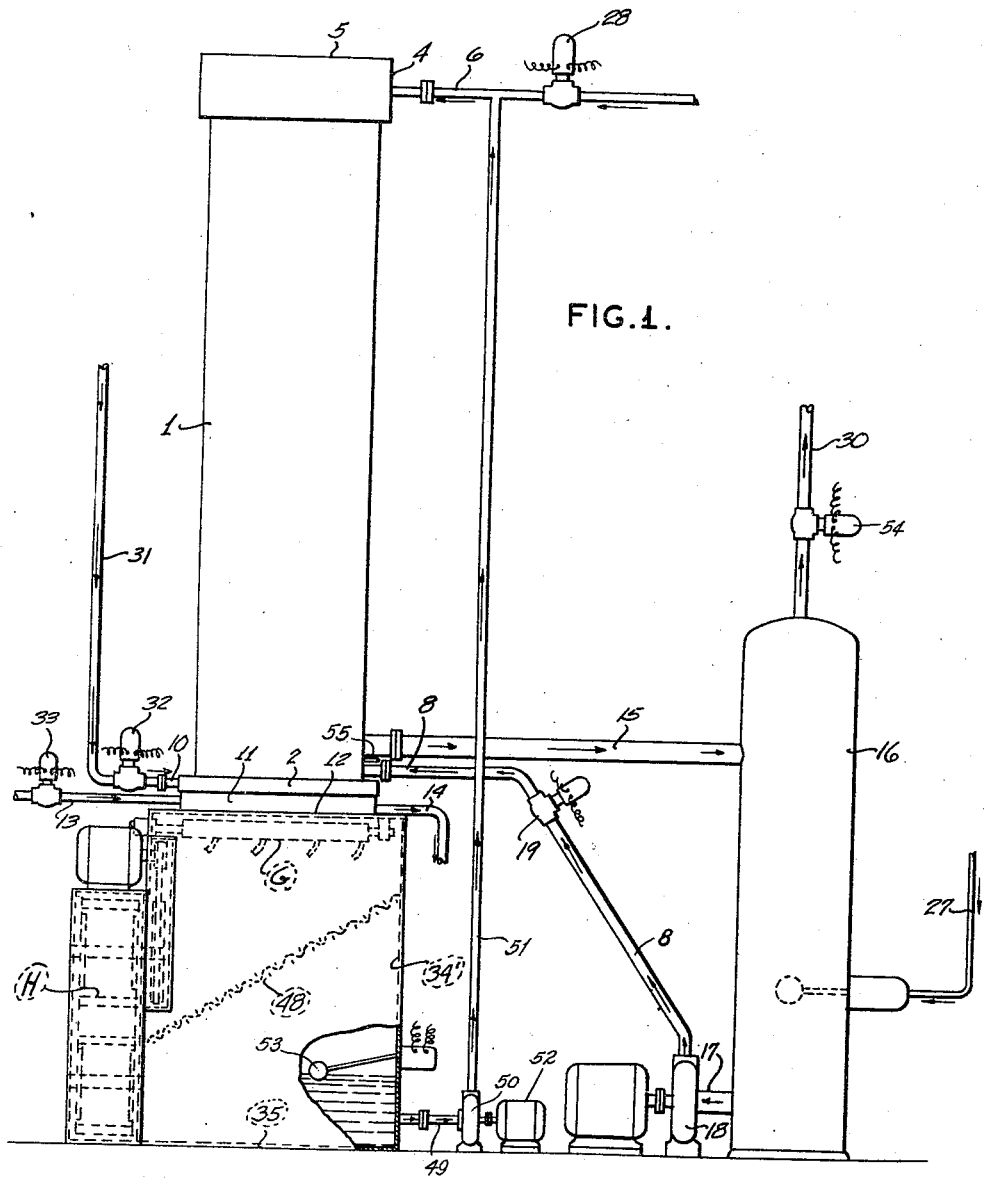
Figure 1 is an elevational view of an ice-making and breaking machine constructed in accordance with and embodying my invention.

Referring now more in detail and by reference characters to the drawings, which illustrate a preferred embodiment of my invention, the present machine, briefly now described, includes a preferably cylindrical shell 1, suitably at its lower end or base rested upon and joined to a marginally extended lower closure-plate or tube-sheet 2 of suitable thickness, as best seen in Figure 6. Suitably joined to the shell 1 at its upper end, is a closure-plate or tube-sheet 3, which preferably marginally projects outwardly beyond the perimeter of the shell 1 in the provision of an attachment flange, as at 3ª, upon which is rested, and to which is suitably joined, the lower margin of a preferably annular wall 4, suitably fixed or joined to which at its upper margin, is an annular sheet 5 forming with walls 3 and 4 a water-supply chamber, as at A, which is substantially a part of the shell 1 and into which leads from any suitable source of water supply an inlet or supply pipe 6.

Welded or otherwise fixed in, and extending transversely across, the shell 1, is an intermediate tube-sheet 7 spaced a suitable distance upwardly from the lower shell-wall or tube-sheet 2 in the provision in shell 1 of a chamber B.

Leading into the chamber B from a suitable source of liquid refrigerant supply, presently described, is an intake or supply-pipe 8, and having communication with a channel 9 in plate 2 discharging into the chamber B, is a supply-pipe 10 leading from any suitable source of hot gas or fluid supply, not shown, the chamber B accommodating and receiving in alternation liquid refrigerant and a defrosting medium or fluid, for purposes presently appearing.

Disposed in spaced parallel relation to and under, and by means of a vertically disposed wall 11 suitably joined adjacent its margin to, the wall or plate 2, is an additional plate or sheet 12 forming with the walls 2 and 11 a warm or hot water or defrosting chamber C, also forming substantially a part of shell 1 and leading into which from any suitable source of hot water or other hot fluid supply, is an intake-pipe 13, and discharging from which is a drain or exhaust pipe 14.

The spaced tube-sheets 3 and 7 further provide within the shell 1 a so-called exhaust chamber D, and leading from and preferably adjacent the lower end of the chamber D, is a refrigerant-and-gas exhaust recirculation pipe 15 connected to and communicating with a suitable gas-liquid separator or so-called sump-tank 16. Adjacent the bottom of the tank 16, is a suction connection 17 to a conventional recirculation pump 18, which is at its discharge side connected, in turn, to the refrigerant intake pipe 8, which latter is preferably, for purposes presently appearing, equipped with a suitable solenoid or other fluid-flow control valve 19.

The plate 12 is preferably marginally extended outwardly, as at 12ª, beyond the perimeter of shell 1 and forms substantially the top wall of an ice-breaking or chipping chamber E, presently fully described.

Mounted in the shell 1 and suitably fixed in and extending through the end walls 3 and 12 and intermediate walls 7 and 2, is a plurality of longitudinal heat exchange tubes 20 each opening at its lower end into the chamber E and each at its upper end being equipped with a closure disk 21 suitably apertured for accommodating and seating tube-extensions 22, each at its lower end being flared outwardly, as at 22ª, for engaging the inner face of the respective tubes 20, and provided intermediate its ends and above the closure members 21 with an annual series of inlet openings, as at 22ᵇ, for enabling the water supplied into the chamber A to flow substantially in the form of a tube downwardly within the respective fixed ice-forming tubes or chambers 20.

Figures 2, 3, 4, 5:
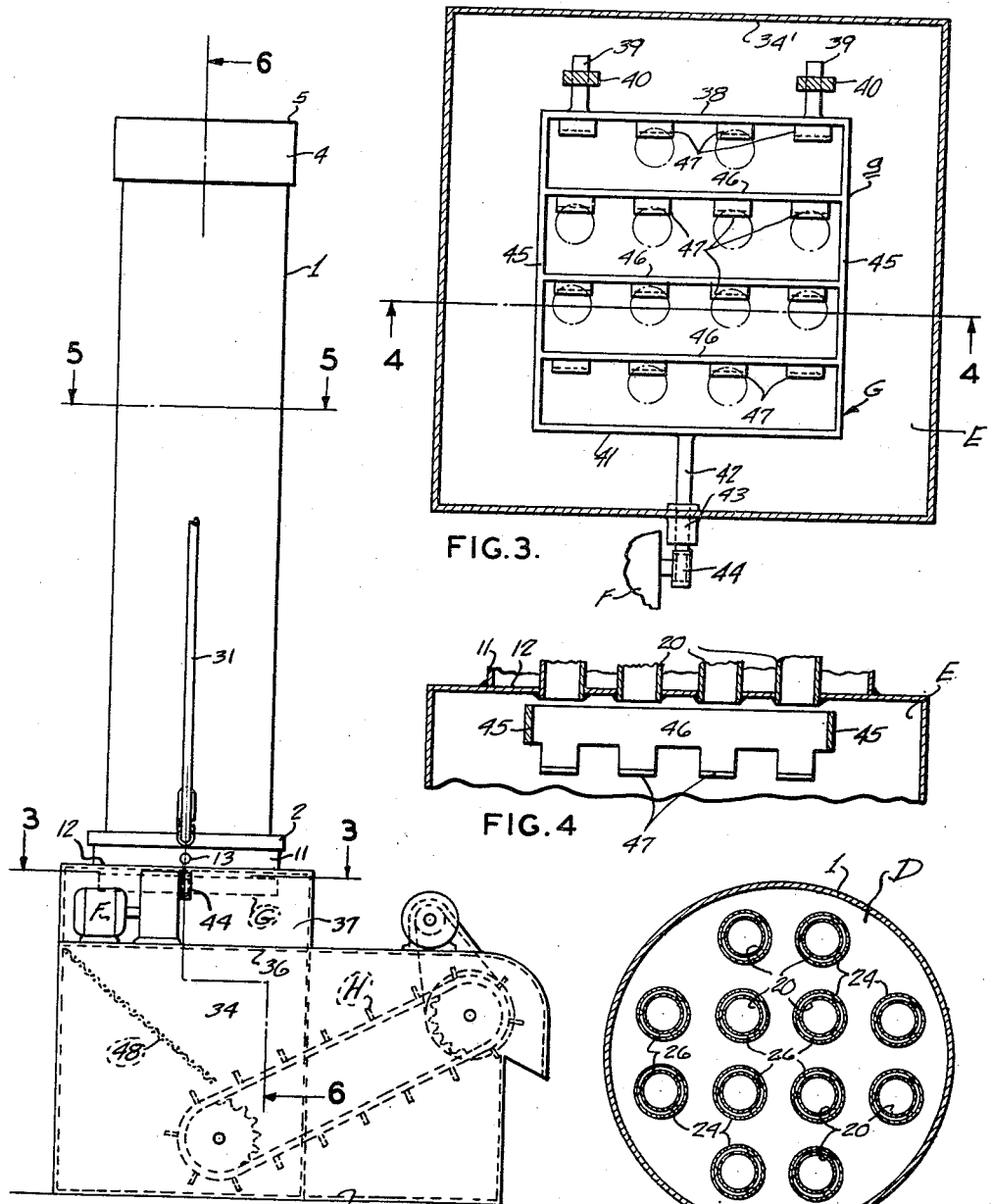
Figure 2 is an end view of the machine.
Figure 3 is an enlarged transverse sectional view of the machine taken approximately on the line 3—3, Figure 2.
Figure 4 is a transverse sectional view of the machine taken approximately on the line 4—4, Figure 3.
Figure 5 is an enlarged transverse sectional view of the machine taken approximately on the line 5—5, Figure 2.

Suitably at or adjacent their respective lower ends fixed, as at 23, to the plate or sheet 7, and upstanding in chamber D preferably concentrically about the ice-forming or heat-exchange tubes 20, are distributor tubes 24, which at their respective upper ends open into the chamber D and at their respective lower ends into the chamber B, the tubes 24 being of slightly greater diameter than the diameter of the particular tubes 20 with which they are associated and being preferably provided upon their inner face with laterally presented knobs or projections, as at 25, for suitably spacing the tubes 23 from the embraced tubes 20, as best seen in Figures 5 and 6. So disposed and related, the tubes 24 provide annular refrigerant-confining channels 26 about the tubes 20 for purposes shortly appearing.

It may be here stated that the liquid refrigerant, which, with the surrounding structure, is of a type for effecting freezing temperature in and about the tubes 20, is flooded by recirculating pump 18 into the space or chamber B and flows under pressure upwardly from chamber B through the confining channels 26 provided by the distributor-tubes 24 and discharges from the tubes 24 into the chamber D. Thus the refrigerant is directed by the respective distributor-tubes 24 in the form of a rapidly moving continuous film over the outer surface of each of the particular tubes 20, with the result that the water flowing substantially in the form of a tube downwardly within the respective tubes 20 is frozen in situ into elongated ice-rods or tubes and adheres in such freezing condition to the inner face of the respective tubes 20. Any excess refrigerant collects upon the tube-sheet 7 and is drawn out through the pipe 15 and recirculated by the recirculation pump 18 to the refrigerant intake pipe 8, any evaporated liquid refrigerant being compensated for by new or fresh liquid refrigerant flowing or discharging into the tank 16 through the pipe 27 leading from a suitable source of refrigerant supply, not shown.

Surplus water from tubes 20 accumulates in chamber E, which has communication by means of a pipe 49 with the intake side of a suitable pump 50 having communication, in turn, on its discharge side with the pipe 6 through a connecting pipe 51 and driven by a suitable motor 52, the water level in chamber E being maintained by means of a float-control 53 actuating solenoid cut-off valve 28 suitably located in pipe 6.

As diagrammatically indicated in Figure 1, the separator or tank 16 has communication by means of a pipeline 30 with the suction side of a compressor, not shown, of a conventional refrigerator system, the line 30 being equipped with a suitable solenoid-valve 54 for controlling refrigerant back-pressure in the system during the freezing and defrosting cycles.

Now, in use and operation, following a sufficient freezing interval, the flow or discharge of refrigerant material through pipe 8 into the chamber B and the flow or discharge of water through the pipe 6 into chamber A are discontinued, being respectively automatically controlled by means of the line-valve 19 and pump 50, whereupon hot gas or fluid is permitted to flow through pipe 10 and channel 9 into the chamber B, from which chamber such gas or fluid passes or flows upwardly through the several confining channels 26 and about the tubes 20 and likewise discharges into the chamber D and from the chamber D through pipe 15 into the tank 16, where the gas and refrigerant are suitably separated and the gas directed from the tank 16 by means of pipe 30 to a suitable compressor, not shown, for gas recirculation through a pipe 31 having communication, in turn, through pipe 10 and channel 9, into the chamber B. In so passing upwardly through the confining channels 26, such gas functions to defrost the major portion of the tubes 20 for thereby releasing to such extent the ice-tubes or rods T from adherence to the inner face of the respective walls thereof.

And concurrently during such defrosting period, hot water is suitably supplied into the chamber C through the pipe 13 from a suitable source of supply, which likewise functions to defrost the lower end-portions of the tubes 20 for completing the releasing of the ice-tubes or rods T from total adherence to the walls of the respective tubes 20, when the released frozen tubes or rods T, as indicated in Figure 7, fall by gravity outwardly and downwardly from the tubes 20, the supplied ice-releasing water draining out through the discharge-pipe 14.

I may here add that, in turn, following a sufficient defrosting interval and release of the ice-tubes or rods T, the flow of hot gas and hot water are automatically broken or discontinued by means of a control-valve 32 in pipe 31 and a like valve 33 in supply-pipe 13, when the control 19 and water pump 50 automatically operate to permit refrigerant and water to again flow or discharge into the respective chambers B and A through the respective inlet or supply-pipes 8 and 6. Thus the machine alternately freezes the inflowing water into the form of ice-tubes or rods T and then defrosts the tubes 20 for discharge of the ice-tubes T from and through the respective lower open ends thereof into the chamber E. As shown, the shell 1 is provided with a suitable opening or outlet, as at 55, for venting any air within the chamber D for facilitating and augmenting defrosting.

Associated with the wall 12 in the formation of the chamber E, are side walls 34, 34', and a bottom wall 35, the one side wall 34 being so shaped and also associated with top and side wall-sections 36 and 37, respectively, in the formation of a support or table for a prime mover F.

G designates what may well be termed an ice-tube or rod breaker, which includes a grid g of rectangular or other suitable contour, projecting from one outer or end wall 38 of which are spaced rigid arms 39 having a bearing for grid-reciprocation in brackets 40 depending from wall 12, and projecting from the opposite outer or end wall 41 of which is a pitman or connecting-rod 42 having support for grid-reciprocation in a bearing 43 provided in wall-section 37, the pitman 39 at its free outer end having eccentric connection, as at 44, with the prime mover F, as best seen in Figure 6.

Connecting the grid end walls 38, 41, are side walls 45, 45, and forming part of the grid g and disposed in suitably spaced relation between the end walls 38, 41, and fixed to the side walls 45, are strips 46, depending from which and also from the rear end wall 38 in spaced relation transversely of the grid, are arcuate fingers 47, the grid g being so normally registrably disposed with respect to the lower ends of the tubes 20, as seen in Figure 4, that the ice-tubes T, in a defrosting interval, will drop or descend through the spaces provided for the purpose intermediate the strips 46. In such downward travel and during the intermittent periods of defrosting, the respective tubes T are, on reciprocation of the grid g, engaged by the chipping fingers 47 and thereby broken into relatively small successive fragments or pieces, which, in turn, drop or fall in succession upon a screen 48 obliquely disposed within the chamber E, then deposited by the screen 48 onto a suitably driven endless conveyor H, and by the conveyor H discharged from the chamber E, as best seen in Figure 2.

The machine has experimentally been found exceedingly efficient in the performance of its functions, and it is to be understood that changes and modifications in the form, construction, arrangement, and combination of the several parts of the machine may be made and substituted for those herein shown and described without departing from the nature and principle of my invention.

Having thus described my invention, what I claim and desire to secure by Letters Patent is:

1. In an ice-making machine, a shell, a series of heat exchange tubes disposed longitudinally in spaced relation within the shell, a series of distributor tubes embracing and providing channels annularly about the heat exchange tubes, means for supplying water for flow into the heat exchange tubes, the shell having a chamber in communication with said channels, and means for alternately supplying refrigerant and a hot fluid to said chamber for passage through said channels and about the heat exchange tubes for freezing the supplied water in, and then defrosting the heat exchange tubes.

2. In an ice-making machine, a water-supply chamber, a shell including a refrigerant-supply chamber and a refrigerant-discharge chamber, a series of heat exchange tubes disposed longitudinally in spaced relation within the shell and opening at an end into said water-supply chamber, a series of distributor tubes embracing and providing channels about the heat exchange tubes, the distributor tubes opening at one end into the refrigerant-supply chamber and at their other end into the refrigerant-discharge chamber, means for supplying water into the water-supply chamber for flow into the heat exchange tubes, and means for supplying refrigerant to said refrigerant-supply chamber for passage through said channels and about the heat exchange tubes for freezing in the heat exchange tubes the supplied water and for discharge into said refrigerant discharge-chamber.

3. In an ice-making machine, a water-supply chamber, a shell including a refrigerant-supply chamber and a refrigerant-discharge chamber, a series of heat exchange tubes disposed longitudinally in spaced relation within the shell and opening at their upper end into said water-supply chamber, a series of distributor tubes embracing and providing channels disposed embracingly about the heat exchange tubes, the distributor tubes opening at their lower end into the refrigerant-supply chamber and at their upper end into the refrigerant-discharge chamber, means for supplying water to the water-supply chamber for flow into the heat exchange tubes, and means for supplying refrigerant to said refrigerant-supply chamber for passage upwardly through said channels and about the heat exchange tubes for freezing in the heat exchange tubes the supplied water and for discharge into said refrigerant discharge-chamber.

4. In an ice-making machine, a water-supply chamber, a shell including a refrigerant-supply chamber and a refrigerant-discharge chamber, a series of heat exchange tubes disposed longitudinally in spaced relation within the shell and opening at their upper end into said water-supply chamber, a series of distributor tubes embracing and providing channels disposed embracingly about the heat exchange tubes, the distributor tubes opening at their lower end into the refrigerant-supply chamber and at their upper end into the refrigerant-discharge chamber, means for supplying water to the water-supply chamber for flow into the heat exchange tubes, means for supplying refrigerant to said refrigerant-supply chamber for passage upwardly through said channels and about the heat exchange tubes for freezing in the heat exchange tubes the supplied water and for discharge into said refrigerant discharge-chamber, and means for recirculating the liquid refrigerant from the discharge-chamber to the refrigerant-supply chamber for successive travel through said channels and about the heat exchange tubes.

5. In an ice-making machine, a water supply chamber, a shell including a first chamber for alternately receiving a refrigerant and a hot fluid and a second chamber for the alternate discharge of the refrigerant and the hot fluid, a series of heat exchange tubes disposed longitudinally in spaced relation within the shell and opening at their upper end into the water supply chamber, a series of distributor tubes embracing and providing channels about the heat exchange tubes, the distributor tubes opening at their lower end into the second chamber and at their upper end into the first chamber, means for supplying water into the water supply chamber for flow into the heat exchange tubes, and means for alternately supplying liquid refrigerant and the hot fluid to the first chamber for successive passage through said channels and about the heat exchange tubes for alternately freezing the supplied water in, and releasing the formed ice from adherence to the inner face of, the heat exchange tubes and for alternate discharge into said second chamber.

6. In an ice-making machine, a water supply chamber, a shell including a first chamber for alternately receiving a refrigerant and a hot fluid and a second chamber for the alternate discharge of the refrigerant and the hot fluid, a series of heat exchange tubes disposed longitudinally in spaced relation within the shell and opening at their upper end into the water supply chamber, a series of distributor tubes embracing and providing channels about the heat exchange tubes, the distributor tubes opening at their lower end into the second chamber and at their upper end into the first chamber, means for supplying water into the water supply chamber for flow into the heat exchange tubes, means for alternately supplying liquid refrigerant and the hot fluid to the first chamber for successive passage through said channels and about the heat exchange tubes for alternately freezing the supplied water in, and releasing the formed ice from adherence to the inner face of, the heat exchange tubes and for alternate discharge into said second chamber, means for leading the liquid refrigerant and hot fluid from the second chamber for separation, and means for redirecting the liquid refrigerant into the first chamber for recirculation through said channels and about the heat exchange tubes.

7. In an ice-making machine, a water-supply chamber, a shell including a first chamber for refrigerant-supply, a second chamber for refrigerant-discharge, and a third chamber for hot fluid supply, a series of heat exchange tubes disposed longitudinally in spaced relation within the shell, said tubes opening at their upper end into the water supply chamber and having their lower ends projecting through the third chamber, a series of distributor tubes providing channels about the heat exchange tubes, the distributor tubes opening at one end into the first chamber and at their other end into the second chamber, means for supplying water into the water supply chamber for flow into the heat exchange tubes, means for supplying liquid refrigerant to the first chamber for passage through said channels and about the heat exchange tubes for freezing the supplied water and for discharge into the second chamber, and means for directing a hot fluid into the third chamber for relatively warming the lower end portions of the heat exchange tubes for effecting release of adherence thereto of the formed ice.

8. In an ice-making machine, a shell provided with a top wall, a bottom wall, and spaced intermediate walls forming an expansion chamber, a hot water chamber underlying the expansion chamber, and an inlet chamber intermediate the hot water and expansion chambers, a water supply chamber disposed upon the top wall, a series of heat exchange tubes fixed in the top and bottom walls and extending through the intermediate walls, said tubes opening at their upper end into the water-supply chamber, a series of distributor tubes fixed at their lower end in the upper intermediate wall, the distributor tubes embracing and providing channels about the heat exchange tubes, the distributor tubes opening at their upper end into the expansion chamber and at their lower end into said inlet chamber, means for supplying water to the water supply chamber for flow into the heat exchange tubes, means for alternately supplying liquid refrigerant and hot fluid to the inlet chamber for passage through said channels and about the heat exchange tubes for freezing the supplied water in, and releasing the formed ice from adherence to, the major portion of the heat exchange tubes and for successive discharge into said expansion chamber, and means for directing hot water into the hot water chamber for defrosting the lower end portions of the heat exchange tubes for completing defrosting thereof for effecting total release of adherence thereto of the formed ice.

WILLIAM P. GRUNER.